US012293865B2

(12) United States Patent
Zhang et al.

(10) Patent No.: US 12,293,865 B2
(45) Date of Patent: May 6, 2025

(54) MANUFACTURING METHOD OF WIRELESS CHARGING MODULE (71) Applicant: KUNSHAN LIANTAO ELECTRONIC CO., LTD, Kunshan (CN)

(72) Inventors: Hong Zhang, Kunshan (CN); ChengLiang Zhang, Kunshan (CN)

(73) Assignee: KUNSHAN LIANTAO ELECTRONIC CO., LTD, Kunshan (CN)

( * ) Notice: Subject to any disclaimer, the term of this patent is extended or adjusted under 35 U.S.C. 154(b) by 36 days.

(21) Appl. No.: 17/975,020

(22) Filed: Oct. 27, 2022

(65) Prior Publication Data
US 2023/0047913 A1 Feb. 16, 2023

Related U.S. Application Data (63) Continuation of application No. 15/930,139, filed on May 12, 2020, now abandoned.

(30) Foreign Application Priority Data

May 23, 2019 (CN) .......................... 201910432430.3

(51) Int. Cl.
H01F 27/36 (2006.01)
H01F 27/28 (2006.01)
(Continued)

(52) U.S. Cl.
CPC ......... H01F 27/2876 (2013.01); H01F 27/36 (2013.01); H01F 38/14 (2013.01);
(Continued)

(58) Field of Classification Search
CPC ...... H01F 27/2876; H01F 27/36; H01F 38/14; H01F 41/04; H01F 27/22; H01F 27/366; H02J 7/02; H02J 50/10; H02J 50/005
See application file for complete search history.

(56) References Cited

U.S. PATENT DOCUMENTS 8,629,654 B2   1/2014  Partovi et al.
2015/0212557 A1* 7/2015 Lin .................. G06F 1/203
                                         361/679.54
(Continued)

FOREIGN PATENT DOCUMENTS

CN    205039585 U    2/2016
CN    106531706 A    3/2017
(Continued)

OTHER PUBLICATIONS

CN-109462973-A (electronic translation) (Year: 2019).*
(Continued)

Primary Examiner — Nghia M Doan
(74) Attorney, Agent, or Firm — Birch, Stewart, Kolasch & Birch, LLP (57) ABSTRACT The present disclosure disclosed a wireless charging module manufacturing method. The method includes the following steps: forming a first heat dissipating layer on a surface of a coil; and securing a magnetic shield part to the surface of the coil away from the first heat dissipating layer. A wireless charging module is manufactured by the method. By completely cover the coil with the first heat dissipating layer in the present disclosure, the first heat dissipating layer possesses excellent heat radiation, effectively improving the heat dissipation of the coil. The thickness of the first heat dissipating layer is controllable. Therefore, an effective and
(Continued)

highly stable heat dissipating performance can be provided without increasing the thickness and cost of the wireless charging module.

15 Claims, 5 Drawing Sheets

(51) Int. Cl.
*H01F 38/14* (2006.01)
*H01F 41/04* (2006.01)
*H02J 7/02* (2016.01)
*H02J 50/10* (2016.01)

(52) U.S. Cl.
CPC ............... *H01F 41/04* (2013.01); *H02J 7/02* (2013.01); *H02J 50/10* (2016.02)

(56) References Cited

U.S. PATENT DOCUMENTS

| | | | |
|---|---|---|---|
| 2017/0310147 A1* | 10/2017 | Wu | H02J 7/0042 |
| 2018/0177075 A1* | 6/2018 | Kweon | H01F 27/366 |
| 2021/0044019 A1* | 2/2021 | Sohn | H04B 5/43 |

FOREIGN PATENT DOCUMENTS

| | | | | |
|---|---|---|---|---|
| CN | 207234480 U | | 4/2018 | |
| CN | 208015456 U | | 10/2018 | |
| CN | 108766707 A | | 11/2018 | |
| CN | 109036796 A | | 12/2018 | |
| CN | 208272653 U | | 12/2018 | |
| CN | 208284341 U | | 12/2018 | |
| CN | 109245325 A | | 1/2019 | |
| CN | 109462973 A | * | 3/2019 | ............... H05K 9/00 |
| JP | 2014-132658 A | | 7/2014 | |
| JP | 2017-54886 A | | 3/2017 | |
| KR | 10-2015-0082895 A | | 7/2015 | |
| KR | 20170043276 A | | 4/2017 | |
| KR | 20200018001 A | | 2/2020 | |
| WO | WO 2016114528 A1 | | 7/2016 | |

OTHER PUBLICATIONS

Li et al., "A magnetic field shielding sheet and manufacturing method thereof," Electronic translation of CN-109462973-A, 2019, pp. 1-5.
Radiation coefficient—T&M Atlantic (tmatlantic.com).
Thermodynamics and Heat Transfer, 3.14.5 Thermal Conductivity Coefficient, J. Carvill, in Mechanical Engineer's Data Handbook, 1993 (Year: 1993).

* cited by examiner

MANUFACTURING METHOD OF WIRELESS CHARGING MODULE

CROSS REFERENCE TO RELATED APPLICATION

This application is a Continuation Application of U.S. patent application Ser. No. 15/930,139, filed on May 12, 2020, which claims the priority benefit of Country Patent Application Serial Number 201910432430.3, filed on May 23, 2019. These and all other referenced extrinsic materials are incorporated herein by reference in their entirety.

BACKGROUND

Technical Field

The present disclosure relates to the technical field of charging apparatus, particularly to a manufacturing method of wireless charging module.

Related Art

Wireless charging, also known as inductive charging or non-contact charging, is a charging technology derived from wireless power transfer technology. During wireless charging, the coil generates heat when the current is passing through, and produces a large amount of heat in a narrow and sealed space of an apparatus, resulting in decreasing of the charging efficiency, working efficiency and service life of electronic device. The conventional wireless charging module bonds one side of the coil and the spacer, and attaches the other side of the coil with an ordinary film. The ordinary film has low thermal conductivity and large thermal resistance, and it is difficult to completely discharge the air on the interface during the process of attaching the non-flat coil with the spacer. The thermal resistance of the air with low thermal conductivity is large, so the heat transfer efficiency is low.

SUMMARY

The embodiments of the present disclosure provide a wireless charging module and manufacturing method thereof to solve the problems of poor heat dissipating of ordinary film in the prior art.

In one embodiment of the present disclosure, a wireless charging module is provided, which comprises a magnetic shield part, a coil and a first heat dissipating layer. The coil is disposed on the magnetic shield part, and the first heat dissipating layer is disposed on the surface of the coil away from the magnetic shield part.

In another embodiment of the present disclosure, the manufacturing method comprises forming the first heat dissipating layer on the surface of the coil and securing the magnetic shield part to the surface of the coil away from the first heat dissipating layer.

In the embodiment of the present disclosure, the first heat dissipating layer can completely cover the coil. The first heat dissipating layer with excellent radiation heat dissipation capability is helpful for heat dissipating of the coil, and the thickness of the first heat dissipating layer is controllable so an effective and stable heat dissipating performance can be provided without increasing the thickness and cost of the wireless charging module.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the disclosure.

Figure 1:
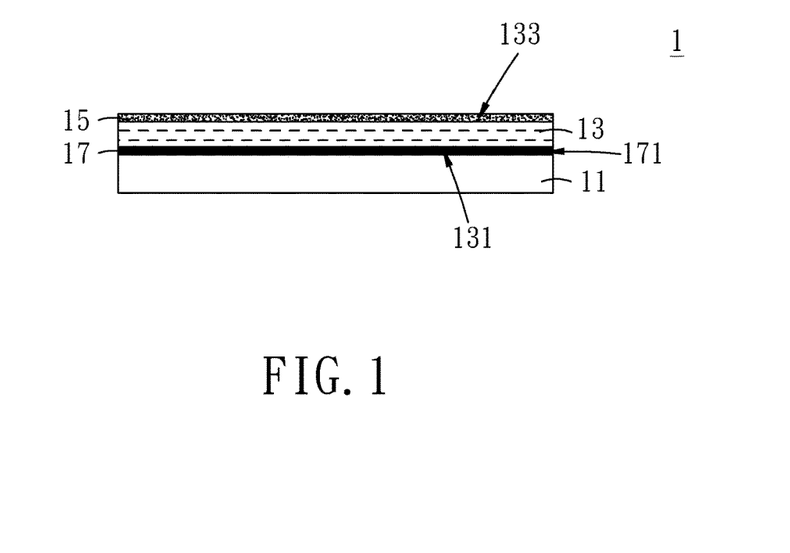
FIG. 1 is a schematic diagram of the first embodiment of the wireless charging module of the present disclosure.

FIG. 1 is a schematic diagram of the first embodiment of the wireless charging module of the present disclosure. As shown in the figure, a wireless charging module 1 of the present embodiment is applied for wireless charging technology. The wireless charging module 1 of the present disclosure can be used for a charging device of a charging end (i.e., a transmitting end) or an electronic device of an end to be charged (i.e., a receiving end), and the wireless charging module 1 of the charging device delivers energy to the wireless charging module 1 of the electronic device through inductive coupling to charge the electronic device.

The wireless charging module 1 comprises a magnetic shield part 11, a coil 13 and a first heat dissipating layer 15. The coil 13 has a first surface 131 and a second surface 133 opposite to the first surface 131. The magnetic shield part 11 is disposed on the first surface 131 of the coil 13, the first heat dissipating layer 15 is disposed on the second surface 133 of the coil 13, and the second surface 133 is away from the magnetic shield part 11. In the embodiment, the first heat dissipating layer 15 can be completely attached to the second surface 133 of the coil 13, and the first heat dissipating layer 15 having fine radiation heat dissipation capability is able to provide effective heat dissipation for the coil 13. In the present embodiment, the thermal conductivity coefficient of the first heat dissipating layer is between 0.5 to 2000 W/m·K and the radiation coefficient of the first heat dissipating layer is between 0.90 and 0.95. In some embodiment, the thermal conductivity coefficient of the first heat dissipating layer is between 50 to 2000 W/m·K. In addition, the thickness of the first heat dissipating layer 15 affects the overall thickness and heat dissipation of the wireless charging module 1, and the thickness of the first heat dissipating layer 15 can be adjusted according to the requirements of the user. In the present embodiment, the first heat dissipating layer 15 has a thickness of 5 to 20 um.

The coil 13 is generally made of copper, and the coil 13 is flat wound and attached to the surface of the magnetic shield part 11. In addition, the magnetic shield part 11 can be a hard magnetic plate and a soft magnetic plate. The hard magnetic plate is a ferrite sheet sintered at a high temperature, has a high magnetic permeability, and is suitable for the emitting end. The manufacture of the soft magnetic plate starts with adding the alloy magnetic powder to the plastic or rubber and is followed by a forming processing. The soft magnetic plate can be punched into desired shapes and sizes according to the wireless charging schemes and can be customized according to user requirements. The soft magnetic plate is suitable for the receiving end. Moreover, the coil 13 and the magnetic shield part 11 are bonded to each other by the first adhesive member 17. The first adhesive member 17 is a double-sided tape 171 in the present embodiment.

Figure 2:
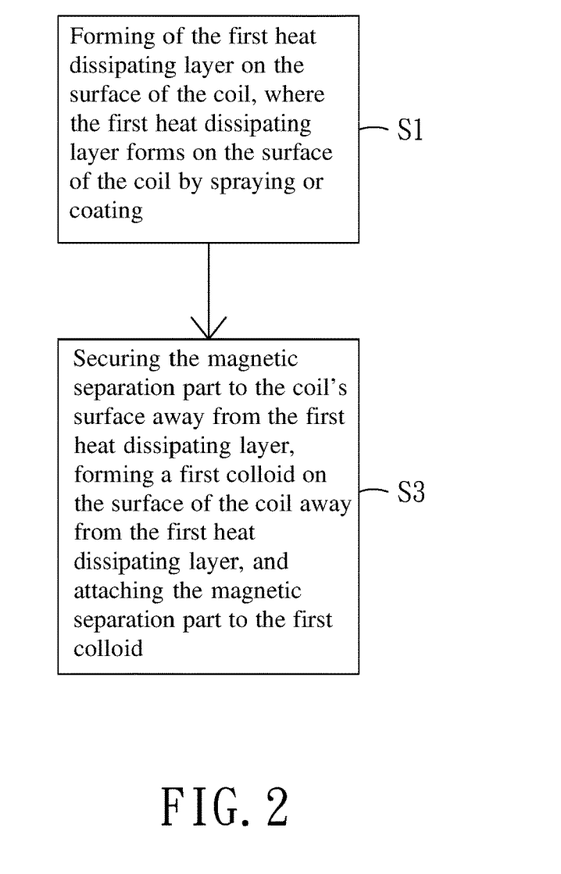
FIG. 2 is a manufacturing flow chart of the first embodiment of the wireless charging module of the present disclosure.

Refer to FIG. 2 together with FIG. 1, which is a manufacturing flow chart of the first embodiment of the wireless charging module of the present disclosure. As shown in the figure, in the embodiment of the manufacturing method of the wireless charging module, the step S1 is first performed to form a first heat dissipating layer 15 on the surface of the coil 13, wherein the first heat dissipating layer 15 is formed on the coil 13 by spraying, coating, or physical vapor deposition (PVD), so that the first heat dissipating layer 15 can be completely attached to the coil 13. In some embodiments, refer to FIG. 1, the first heat dissipating layer 15 may be directly formed on the second surface 133 of the coil 13. In some embodiments, the first heat dissipating layer 15 may be a spraying layer, a coating layer, or a physical vapor deposition layer on the coil 13. In some embodiment, the first heat dissipating layer 15 is formed on the coil 13 by evaporation or sputtering. In some embodiments, the first heat dissipating layer 15 may be an evaporation layer or a sputtering layer on the coil 13. The step S3 is then performed to secure the magnetic shield part 11 to the surface of the coil 13 away from the first heat dissipating layer 15, wherein the first adhesive member 17 is formed on the surface of the coil 13 away from the first heat dissipating layer 15, and the magnetic shield part 11 is attached to the first adhesive member 17.

A wireless charging module 1 is provided in the present embodiment, which can be used for a charging end (i.e., a transmitting end) and an end to be charged (i.e., a receiving end). The wireless charging module 1 can perform conductive heat dissipation by attaching the heat dissipating layer 15 to the surface of the coil 13. As a result, when the wireless charging module 1 of the present embodiment operates, the thermal energy generated by the coil 13 can be dissipated from the first heat dissipating layer 15 to the outside to prevent the heat energy generated by the coil 13 from accumulating in the wireless charging module 1. The external heat transfer efficiency of the coil 13 is therefore improved. By applying the first heat dissipating layer 15 as described above, there is a 7.5% temperature drop of the wireless charging module 1.

Figure 3:
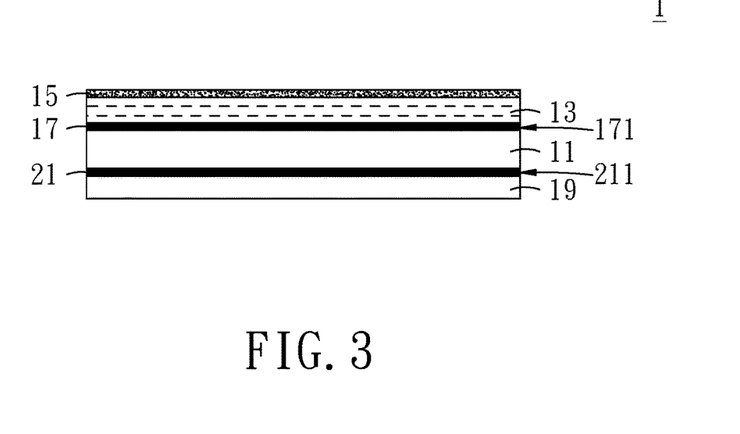
FIG. 3 is a schematic diagram of the second embodiment of the wireless charging module of the present disclosure.

Refer to FIG. 3, which is a schematic diagram of the second embodiment of the wireless charging module of the present disclosure. As shown in the figure, the difference between the present embodiment and the first embodiment is that the wireless charging module of the second embodiment further comprises a second heat dissipating layer 19. The second heat dissipating layer 19 is disposed on the surface of the magnetic shield part 11 away from the coil 13, that is, the second heat dissipating layer 19 and the coil 13 are respectively located on opposite sides of the magnetic shield part 11. The second heat dissipating layer 19 is a heat dissipating component, e.g. heat sink or a heat dissipating fin, made of metal materials with excellent thermal conductivity such as copper or silver. The second heat dissipating layer 19 is bonded to the magnetic shield part 11 by a second adhesive member 21 to secure the second heat dissipating layer 19 onto the magnetic shield part 11. In the embodiment, the second adhesive member 21 is a double-sided tape 211. In the present embodiment, the second heat dissipating layer 19 onto one side surface of the magnetic shield part 11 helps the heat of the magnetic shield part 11 from the coil 13 to dissipate from the second heat dissipating layer 19 to the outside. The thermal energy generated by the wireless charging module 1 of the present embodiment can be conducted from the first heat dissipating layer 15 to the outside, and can also be conducted from the second heat dissipating layer 19 to the outside at the same time, thereby improving the overall heat dissipation.

Figure 4:
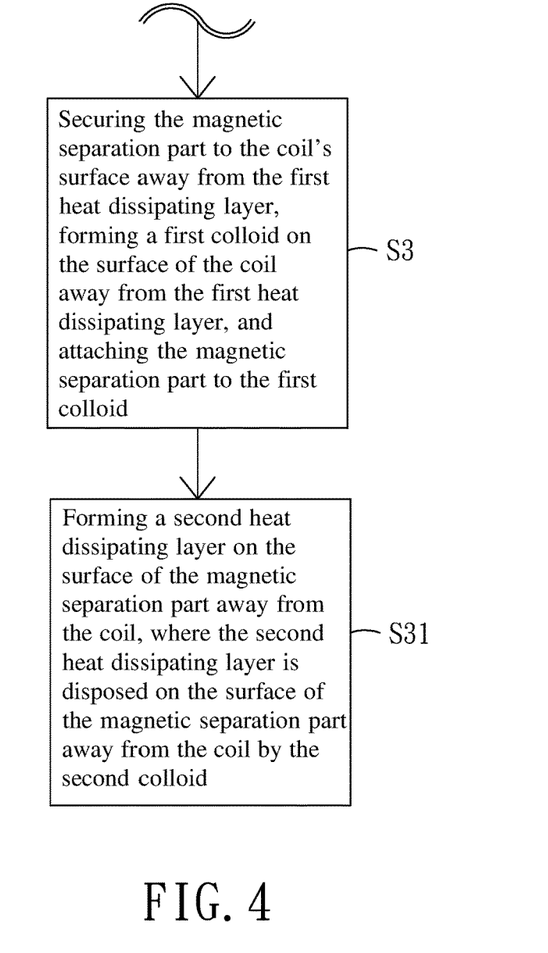
FIG. 4 is a manufacturing flow chart of the second embodiment of the wireless charging module of the present disclosure.

Refer to FIG. 4 together with FIG. 3, which is a manufacturing flow chart of the second embodiment of the wireless charging module of the present disclosure. As shown in the figure, in the present embodiment, the steps S1 and S3 are first performed as FIG. 2. After the step S3 is performed, a step S31 of the second embodiment is performed to form a second heat dissipating layer 19 on the surface of the magnetic shield part 11 away from the coil 13. In the embodiment, the second heat dissipating layer 19 is disposed on the surface of the magnetic shield part 11 away from the coil 13 by the second adhesive member 21. In other words, the second adhesive member 21 is formed on the surface of the magnetic shield part 11 away from the coil 13, and the second heat dissipating layer 19 is attached to the second adhesive member 21.

Figure 5:
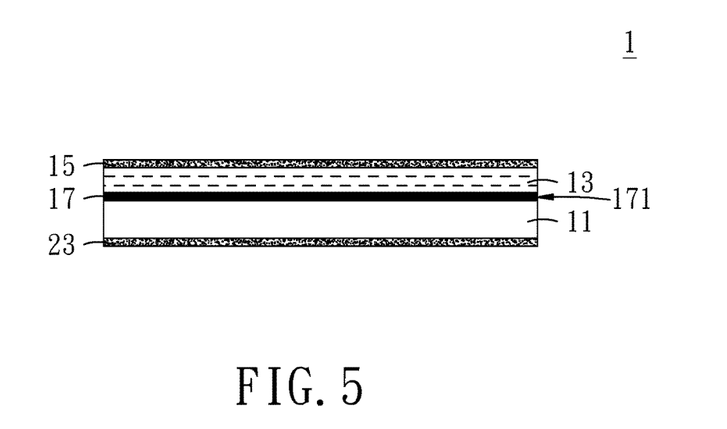
FIG. 5 is a schematic diagram of the third embodiment of the wireless charging module of the present disclosure.

Refer to FIG. 5, which is a schematic diagram of the third embodiment of the wireless charging module of the present disclosure. As shown in the figure, the difference between the present embodiment and the first embodiment is that the wireless charging module of the third embodiment further comprises a second heat dissipating layer 23. The second heat dissipating layer 23 is disposed on the surface of the magnetic shield part 11 away from the coil 13. The material and the functional effects of the second heat dissipating layer 23 are the same as those of the first heat dissipating layer 15, and therefore will not be described again. The present embodiment differs from the second embodiment, in that the second adhesive member 21 is omitted, and the heat of the magnetic shield part 11 is more effectively dissipated by the second heat dissipating layer 23 directly contacting the magnetic shield part 11. In other words, the second heat dissipating layer 23 may be directly formed on the magnetic shield part 11.

Figure 6:
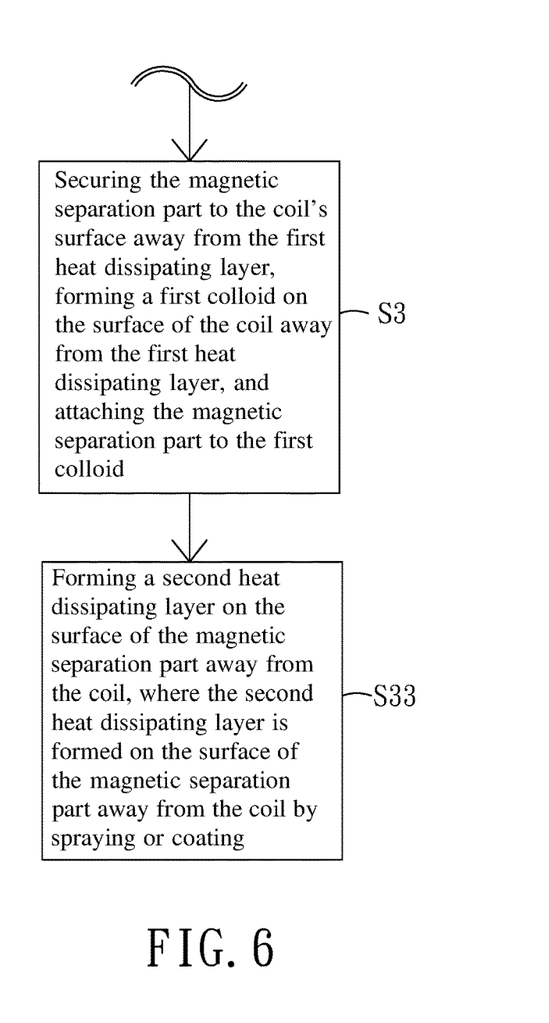
FIG. 6 is a manufacturing flow chart of the third embodiment of the wireless charging module of the present disclosure.

Refer to FIG. 6 together with FIG. 5, which is a manufacturing flow chart of the third embodiment of the wireless charging module of the present disclosure. As shown in the figure, in the present embodiment, the steps S1 and S3 are the same as the aforementioned description, a step S33 of the third embodiment is further performed after the step S3 to form a second heat dissipating layer 19 on the surface of the magnetic shield part 11 away from the coil 13, where the second heat dissipating layer 23 is disposed on the surface of the magnetic shield part 11 away from the coil 13 by spraying, coating, or physical vapor deposition. In some embodiments, the second heat dissipating layer 23 may be a spraying layer, a coating layer, or a physical vapor deposition layer on the surface of the magnetic shield part 11. In some embodiment, the second heat dissipating layer 23 is disposed on the surface of the magnetic shield part 11 away from the coil 13 by evaporation or sputtering. In some embodiments, the second heat dissipating layer 23 may be an evaporation layer or a sputtering layer on the surface of the magnetic shield part 11.

Figure 7:
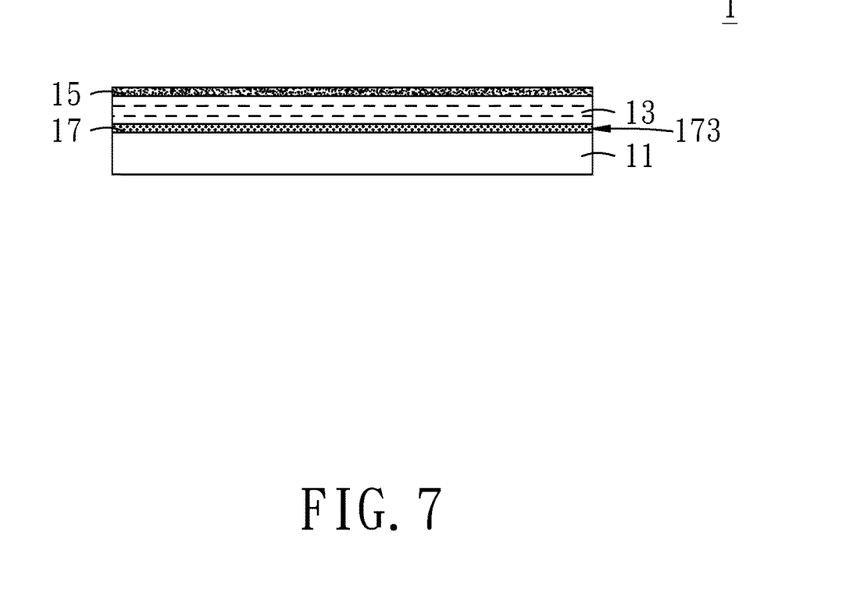
FIG. 7 is a schematic diagram of the fourth embodiment of the wireless charging module of the present disclosure.

Refer to FIG. 7, which is a schematic diagram of a schematic diagram of the fourth embodiment of the wireless charging module of the present disclosure. As shown in the figure, the difference between the present embodiment and the first embodiment is that the first adhesive member 17 of the fourth embodiment is a thermal conductive film 173 or a thermal paste. In the embodiment, the thermal paste is made of a thermosetting reactive thermal paste material such as moisture curing type thermal silicone, and the above thermal conductive film 173 has the same effect as the thermal paste. Therefore, the thermal conductive film 173 will be described as example in the present embodiment. The magnetic isolation member 11 is bonded to the coil 13 by the thermal conductive film 173. The first adhesive member 17 is a non-solid material that can be applied to the gap of the non-flat surface of the coil 13 to reduce the gap between the magnetic shield part 11, the coil 13 and the first adhesive member 17. In other words, the gap can be filled by the first adhesive member 17, and therefore there is no gap existing between the magnetic shield part 11 and the coil 13 creating an excellent thermal conductivity interface and reducing the interface thermal resistance by prevent air having a low thermal conductivity from being filled in the gap, which lowers the thermal conductivity between magnetic shield part 11, the coil 13 and the first adhesive member 17. Moreover, the thermosetting reactive thermal paste possesses high adhesion, high resistance to high and low temperature, and excellent reliability. In addition to reinforcing the structural connection between the magnetic shield part 11 and the coil 13, the first adhesive member 17 also forms an excellent thermal interface between the magnetic shield part 11 and the coil 13, where the thermal conductive film 173 disposed in between the magnetic isolation member 11 and the coil 13 is used for heat dissipation, resulting an approximate 8% temperature reduction in average temperature of the coil 13. In the present embodiment, on one surface of the coil 13 is provided with a first heat dissipating layer 15 and on the other surface is provided with a second heat dissipating layer 19. The heat dissipating of the coil 13 by the two dissipating layers has an advantage of achieving a 14.7% temperature reduction, so that the average temperature of the coil 13 drops significantly by a 2 to 4° C.

Figure 8:
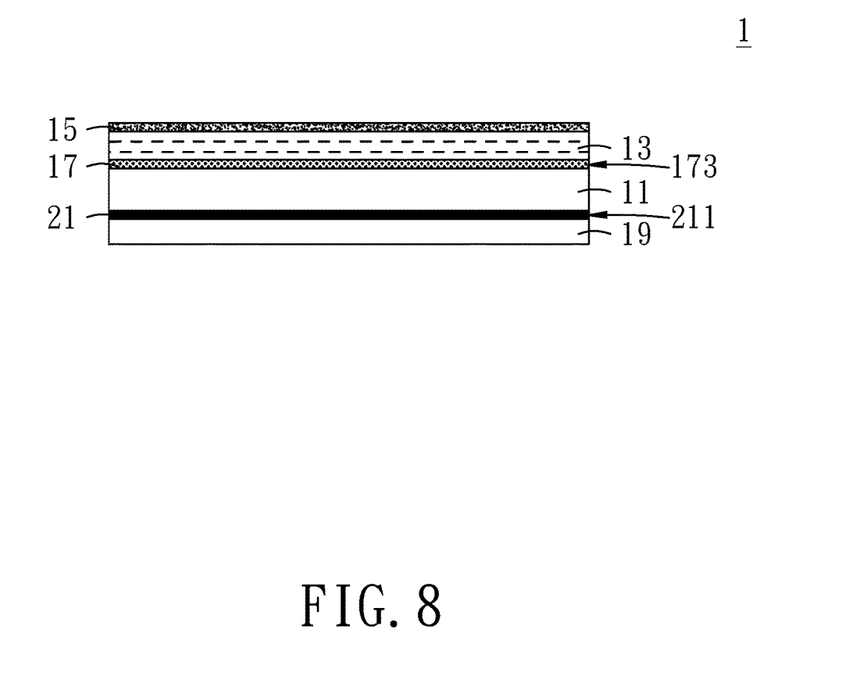
FIG. 8 is a schematic diagram of the fifth embodiment of the wireless charging module of the present disclosure.

Refer to FIG. 8, which is a schematic diagram of the fifth embodiment of the wireless charging module of the present disclosure. As shown in the figure, the difference between the present embodiment and the second embodiment is that the first adhesive member 17 of the embodiment is a thermal conductive film 173 having the same effect as that of the fourth embodiment, which is advantageous for the coil 13 for heat dissipating. Therefore, detailed description of the present embodiment will not be repeated. The effect of the heat dissipating of the present embodiment exceeds that of the second embodiment.

Figure 9:
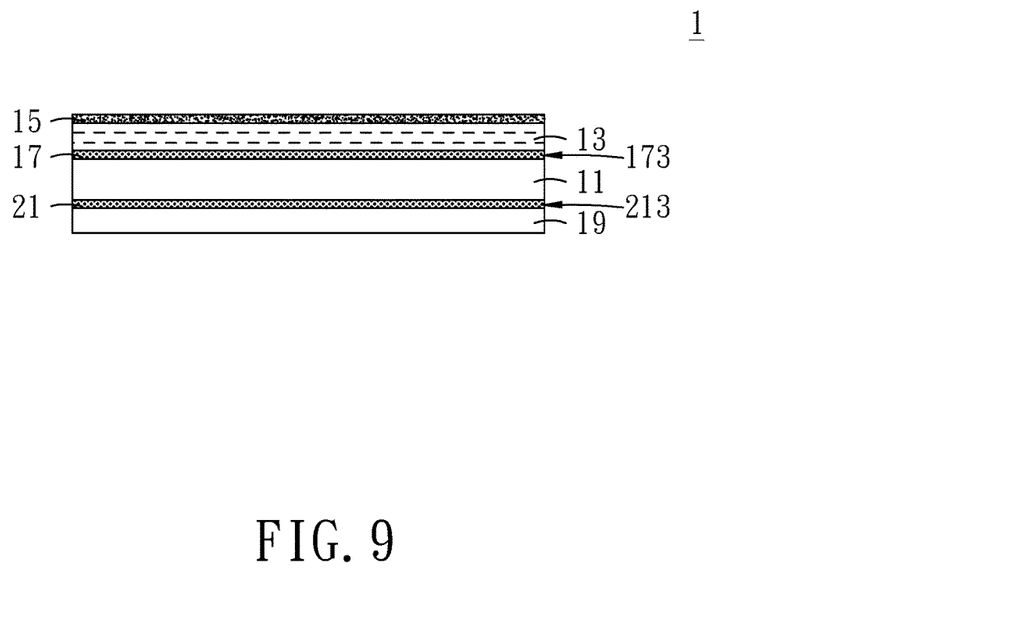
FIG. 9 is a schematic diagram of the sixth embodiment of the wireless charging module of the present disclosure.

Refer to FIG. 9, which is a schematic diagram of the sixth embodiment of the wireless charging module of the present disclosure. As shown in the figure, the difference between the present embodiment and the fifth embodiment is that the second adhesive member 21 of the embodiment is a thermal conductive film 213 or a thermal paste having the same effect as that of the fourth embodiment. Therefore, detailed description of the present embodiment will not be repeated. The thermal conductive film 213 facilitates the connection and the heat dissipation of the magnetic separating part 11 and the second heat dissipating layer 19. The effect of the heat dissipating of the present embodiment exceeds that of the fifth embodiment.

Figure 10:
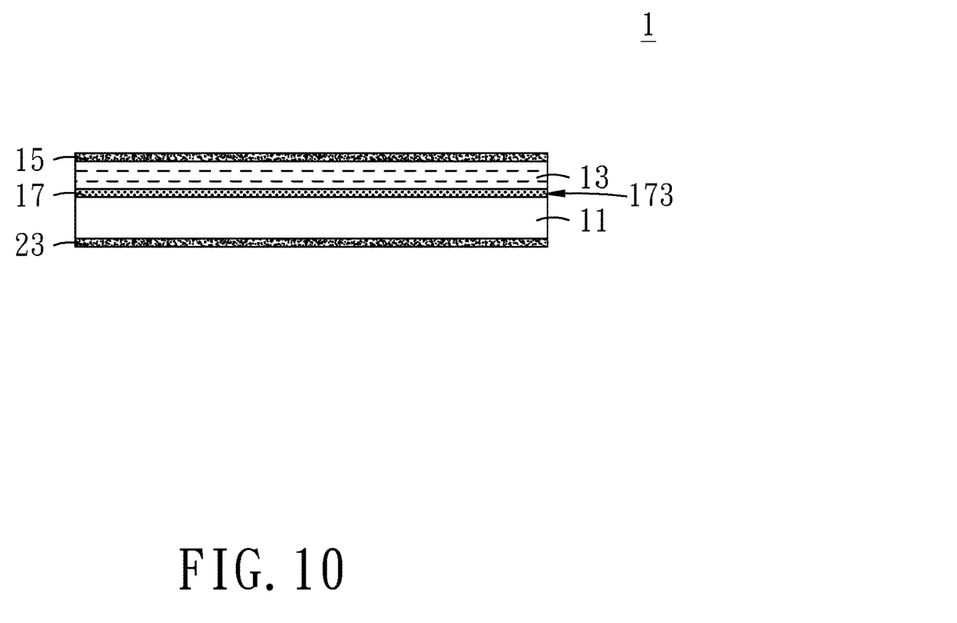
FIG. 10 is a schematic diagram of the seventh embodiment of the wireless charging module of the present disclosure.

Refer to FIG. 10, which is a schematic diagram of the seventh embodiment of the wireless charging module of the present disclosure. As shown in the figure, the difference between the present embodiment and the third embodiment is that the first adhesive member 17 of the embodiment is a thermal conductive film 173 having the same effect as that of the fourth embodiment, which is advantageous for the coil 13 for heat dissipating. Therefore, detailed description of the present embodiment will not be repeated. The effect of the heat dissipating of the present embodiment exceeds that of the third embodiment.

The present disclosure further provides an electronic device in which a wireless charging module 1 is disposed for the function of charging with another wireless charging module 1 of another electronic device. The wireless charging module 1 of another electronic device delivers energy to the wireless charging module 1 of the electronic device through inductive coupling to conduct charging.

In summary, the present disclosure discloses a wireless charging module and manufacturing method thereof. The heat conduction and dissipation of the wireless charging module are directly conducted by the first heat dissipating layer attaching to the surface of the coil, and the first heat dissipating layer is capable of providing an effective heat dissipation to the coil. The first adhesive member between the magnetic shield part and the coil is a thermal conductive film, which not only secures the magnetic shield part onto the coil, but also forms an excellent thermal interface between the magnetic shield part and the coil, so that heat can be dissipated from one side of the coil by the first heat dissipating layer and from the other side of the coil by the first adhesive member and the magnetic shield part, thereby the heat dissipation of the wireless charging module is effectively improved. The wireless charging module of the present disclosure further comprises a second heat dissipating layer disposed on a surface of the magnetic shield part away from the coil, and the second heat dissipating layer is capable of enhancing the heat dissipation efficiency of the magnetic shield part.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A manufacturing method for a wireless charging module, comprising:
    forming a first heat dissipating layer directly on a second surface of a coil by physical vapor deposition; and
    securing a magnetic shield part to a first surface of the coil away from the first heat dissipating layer;
    wherein the step of securing the magnetic shield part to the first surface of the coil away from the first heat dissipating layer comprises:
    forming a first adhesive member on the first surface of the coil away from the first heat dissipating layer, wherein the first adhesive member is a non-solid material and is a thermal conductive film; and
    attaching the magnetic shield part to the first adhesive member;
    wherein the first adhesive member is filled to gaps between the coil, the first adhesive member and the magnetic shield part;
    wherein heat is dissipated from the second surface of the coil by the first heat dissipating layer and from the first surface of the coil by the first adhesive member and the magnetic shield part.

2. The manufacturing method according to claim 1, wherein the step of forming the first heat dissipating layer on the second surface of the coil comprises forming the first heat dissipating layer on the second surface of the coil by evaporation or sputtering.

3. The manufacturing method according to claim 2, wherein the step of forming the first heat dissipating layer on the second surface of the coil by evaporation or sputtering comprises forming the first heat dissipating layer directly on the second surface of the coil by evaporation or sputtering.

4. The manufacturing method according to claim 1, wherein after the step of securing the magnetic shield part to the first surface of the coil away from the first heat dissipating layer, further comprising:
    forming a second heat dissipating layer on other surface of the magnetic shield part away from the coil.

5. The manufacturing method according to claim 4, wherein the step of forming the second heat dissipating layer on the other surface of the magnetic shield part away from the coil comprises disposing the second heat dissipating layer on the other surface of the magnetic shield part away from the coil by a second adhesive member.

6. The manufacturing method according to claim 4, wherein the step of forming the second heat dissipating layer on the other surface of magnetic shield part away from the coil comprises forming the second heat dissipating layer on the other surface of the magnetic shield part away from the coil by spraying, coating, or physical vapor deposition.

7. The manufacturing method according to claim 6, wherein the step of forming the second heat dissipating layer on the other surface of the magnetic shield part away from the coil by spraying, coating, or physical vapor deposition comprises forming the second heat dissipating layer directly on the other surface of the magnetic shield part away from the coil by spraying, coating, or physical vapor deposition.

8. The manufacturing method according to claim 4, wherein the step of forming the second heat dissipating layer on the other surface of magnetic shield part away from the coil comprises forming the second heat dissipating layer on the other surface of the magnetic shield part away from the coil by evaporation or sputtering.

9. The manufacturing method according to claim 8, wherein the step of forming the second heat dissipating layer on the other surface of the magnetic shield part away from the coil by evaporation or sputtering comprises forming the second heat dissipating layer directly on the other surface of the magnetic shield part away from the coil by evaporation or sputtering.

10. The manufacturing method according to claim 1, wherein after the step of securing the magnetic shield part to the first surface of the coil away from the first heat dissipating layer, further comprising:
    forming a second heat dissipating layer on other surface of the magnetic shield part away from the coil.

11. The manufacturing method according to claim 10, wherein the step of forming the second heat dissipating layer on the other surface of the magnetic shield part away from the coil comprises forming the second heat dissipating layer directly on the other surface of the magnetic shield part away from the coil.

12. The manufacturing method according to claim 10, wherein the step of forming the second heat dissipating layer on the other surface of magnetic shield part away from the coil comprises forming the second heat dissipating layer on the other surface of the magnetic shield part away from the coil by spraying, coating, or physical vapor deposition.

13. The manufacturing method according to claim 12, wherein the step of forming the second heat dissipating layer on the other surface of the magnetic shield part away from the coil by spraying, coating, or physical vapor deposition comprises forming the second heat dissipating layer directly on the other surface of the magnetic shield part away from the coil by spraying, coating, or physical vapor deposition.

14. The manufacturing method according to claim 10, wherein the step of forming the second heat dissipating layer on the other surface of magnetic shield part away from the coil comprises forming the second heat dissipating layer on the other surface of the magnetic shield part away from the coil by evaporation or sputtering.

15. The manufacturing method according to claim 14, wherein the step of forming the second heat dissipating layer on the other surface of the magnetic shield part away from the coil by evaporation or sputtering comprises forming the second heat dissipating layer directly on the other surface of the magnetic shield part away from the coil by evaporation or sputtering.

* * * * *